United States Patent
Andrea

[11] 3,884,624
[45] May 20, 1975

[54] NUCLEAR FUEL PREHEATING SYSTEM

[75] Inventor: Christo Andrea, Windsor Locks, Conn.

[73] Assignee: Combustion Engineering, Inc., Windsor, Conn.

[22] Filed: Aug. 15, 1973

[21] Appl. No.: 388,709

[52] U.S. Cl. ............ 432/227; 34/105; 34/236; 176/72; 176/30; 34/225
[51] Int. Cl. .............. F26b 25/00; G21c 3/16
[58] Field of Search ........ 432/23, 26, 227, 59; 34/105, 236, 216, 225; 176/72, 30

[56] References Cited
UNITED STATES PATENTS

| | | | |
|---|---|---|---|
| 2,313,040 | 3/1943 | Alling et al. | 34/105 |
| 3,347,749 | 10/1967 | Jordan | 176/72 |
| 3,437,558 | 4/1969 | Gunson et al. | 176/30 |
| 3,574,952 | 4/1971 | Lee, Jr. | 34/105 |
| 3,726,020 | 4/1973 | Lee, Jr. | 34/105 |
| 3,729,832 | 5/1973 | Lund | 34/105 |
| 3,745,670 | 7/1973 | Hartwig | 34/236 |

*Primary Examiner*—John J. Camby
*Assistant Examiner*—Henry C. Yuen
*Attorney, Agent, or Firm*—Stephen L. Borst

[57] ABSTRACT

A nuclear reactor new fuel handling system which conveys new fuel from a fuel preparation room into the reactor containment boundry. The handling system is provided with a fuel preheating station which is adapted to heat the new fuel to reactor refueling temperatures in such a way that the fuel is heated from the top down so that fuel element cladding failure due to thermal expansion is avoided.

5 Claims, 2 Drawing Figures

NUCLEAR FUEL PREHEATING SYSTEM

BACKGROUND OF THE INVENTION

FIELD OF THE INVENTION

This invention relates to nuclear reactor fuel handling systems which are designed to transport new fuel from a fuel preparation room to the reactor containment building for its insertion into the nuclear reactor.

In a typical liquid sodium cooled fast breeder reactor, the fuel assemblies contain clad fuel elements on the interior of which are located the nuclear fuel pellets surrounded by sodium which acts as a heat exchange medium. Since the freezing point of sodium is 207°F., the sodium will normally take a solid form at the temperatures experienced in new fuel prior to being loaded into the reactor. In order to accommodate the expansion that occurs when the sodium is heated up to refueling temperatures (a precautionary step that is necessary to prevent thermal shock and damage which occurs when cold fuel is placed in the hot liquid sodium of the reactor) an expansion chamber, filled with inert gas, is provided at the top of each clad fuel element. While preheating the new fuel in preparation for its insertion into the reactor, care must be taken that the heating is accomplished first in the end of the fuel which contains the expansion chamber; otherwise, the solid sodium would be unable to expand upon being heated without distorting or rupturing the fuel cladding.

It has been commonplace practice to preheat new fuel assemblies prior to their insertion into the reactor. The practice has been to install the assemblies in the decay tank where they are heated up to the liquid state by the heated sodium in the pool. This procedure requires the entire batch of new fuel assemblies used in refueling to be processed ahead of time and to be stored in the decay tank.

SUMMARY OF THE INVENTION

It is the purpose of the present invention to provide a refueling system which preheats the fuel prior to its being loaded into the reactor without causing unnecessary delay. This is accomplished by providing a heating station to heat the new fuel while it is being conveyed from the fuel preparation room to the interior of the reactor containment building. The heating station consists of ducts positioned above and below the conveyor in such a way that a new fuel assembly can be conveyed to a position of alignment with the ducts so that the ducts can introduce heated gas into the top of the assembly and remove the cooler gas from the bottom of the assembly. In this way it can be assured that the sodium bonded fuel heats from the top down. Accordingly, the expansion of the sodium is accommodated by the expansion chamber located in the top of the fuel assembly and clad damage due to the thermal expansion of rigidly confined sodium is prevented.

DESCRIPTION OF THE PREFERRED EMBODIMENT

Figure 1:
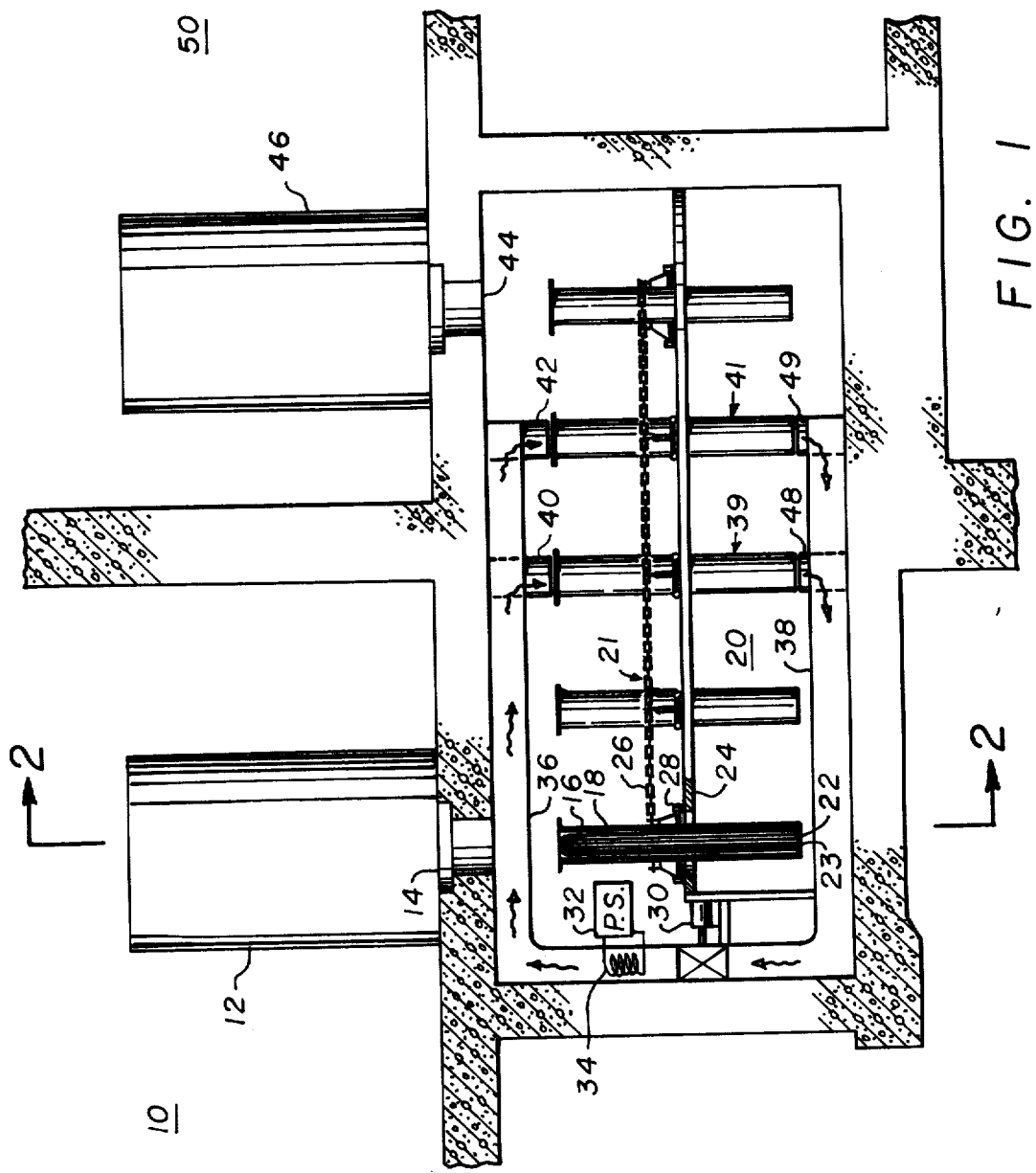
FIG. 1 is a cross-sectional view of the new fuel transfer room connecting the fuel preparation room and the reactor containment building showing the new fuel conveyor and a plurality of heating stations.
Figure 2:
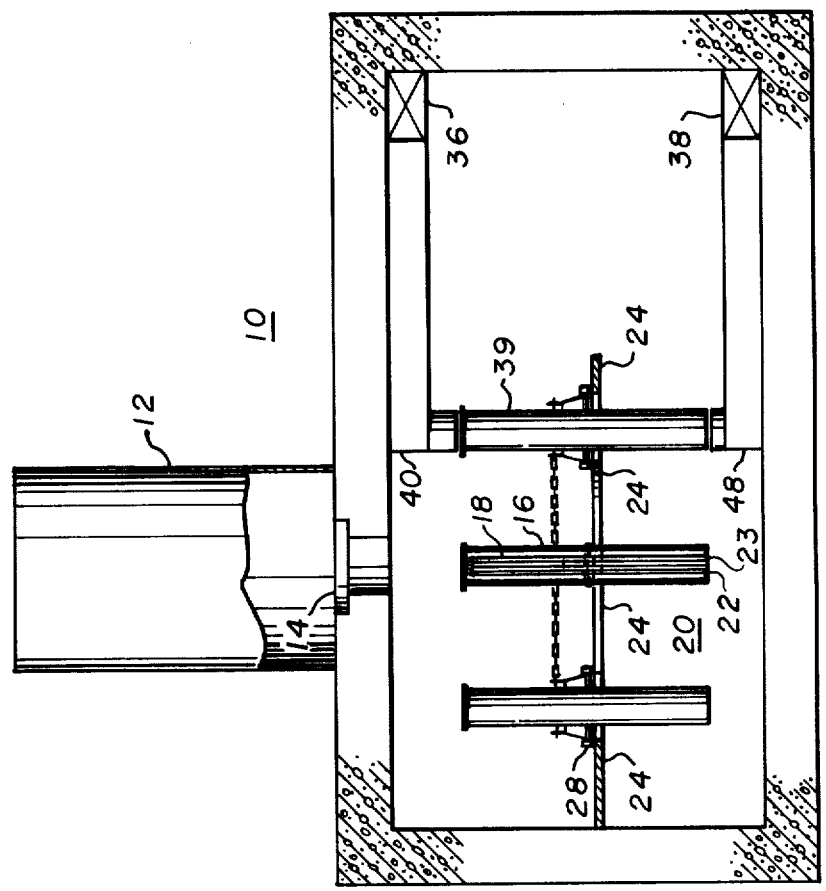
FIG. 2 is a view of the fuel transfer-isolation room taken along line 2—2 of FIG. 1.

FIGS. 1 and 2 depict a portion of a typical nuclear power station. Room 10 is the new fuel preparation room in which the new nuclear fuel is prepared before its insertion into the nuclear reactor which is located in the containment building 50. Chamber 20 is an isolation chamber or fuel transfer room interconnecting the fuel preparation room 10 and the containment building 50. During refueling operations, isolation chamber 20 is normally filled with an inert gas which is the same as the cover gas maintained in the reactor vessel.

Located within the fuel room 20 is a new fuel conveyor 21 (driven by means not shown) consisting of an endless drive chain 26 which follows a somewhat oval path in the horizontal plane and which is made up of links to which are attached wheeled carriages 28. The wheeled carriages 28 travel along support benches 24 and carry insulated transfer containers 16 adapted to receive and carry the new fuel assemblies 18. The bottom ends 22 of the insulated transfer containers 16 are constructed with passages 23 therethrough so that when the new fuel 18 is placed in the insulated transfer container 16 the coolant passages of the new fuel 18 align with the container passages 23, thereby enabling the passage of gas through the entire length of the new fuel assembly 18. In addition, the bottom 22 of the insulated transfer container 16 sealingly engages and supports the bottom periphery of the new fuel element 18. This design allows a gas to be pumped into the top of the insulated transfer container 16 and assures that the only exit therefrom is through the length of the coolant passages of the new fuel 18 from the top down and out the bottom of the new fuel 18 through the provided passages 23 of the insulated transfer container 16.

The subject matter of this invention is the means provided in the fuel transfer room 20 for heating the new fuel assemblies 18 from the top down while they are in transit through the fuel transfer room 20 and prior to their insertion into the reactor core. For this purpose gas duct 36 is provided to deliver heated gas to the top of the insulated transfer container 16 and thus to the top of the new fuel assembly 18. Gas duct 38 is also provided between the bottom of the insulated transfer container 16 and a circulating pump 30, which is connected to the duct 36. Power supply 32 and heating elements 34 are provided to heat the gas before it is delivered through duct 36 to the heating station 39. Gas duct 36 terminates in one or more heating station nozzles 40 and 42 which are adapted to match the top openings of the insulated transfer containers 16. Similar nozzles 48 and 49 connected to gas duct 38 are provided to match with the bottom of the insulated transfer containers 16. The nozzles and the ducts of this gas circulation system are arranged to permit the passage of the insulated transfer containers 16 between the upper and lower nozzles without interference while at the same time allowing the circulation of a forced flow of air from the top nozzle through the new fuel assembly and out the bottom nozzle without an excessive amount of leakage.

In order to better understand the advantages and operation of the present invention it is instructive to follow a new fuel assembly from its preparation to its insertion in the core of the reactor. For illustrative purposes this description will be directed toward a liquid sodium cooled fast breeder reactor. Referring to FIG. 1, the new fuel arrives at the nuclear reactor station and is inspected and tested in the fuel preparation room 10 which is maintained at a room temperature of approximately 70°F. Because of this relatively low temperature, the sodium on the interior of the fuel elements which comprise the fuel assembly 18 is in a solid form. Fuel assemblies of this type are called sodium bonded fuel. After the fuel assembly has passed all of the required inspections and tests, it is placed in an atmospheric change cell 12 over the floor valve 14. The atmosphere in the atmospheric change cell 12 is repeatedly exhausted and flushed with argon until the atmosphere in the cell 12 is of a high degree of purity and matches the gas in the fuel transfer room 20 and the gas maintained as a cover gas over the liquid sodium of the liquid sodium cooled reactor. Once this condition has been attained, the floor valve 14 is removed and the new fuel assembly is lowered from the atmospheric change cell 12 into an awaiting insulated transfer container 16 in the fuel transfer room. The floor valve 14 is then resealed and the conveyor 21 advances the new fuel assembly to the first heating station 39. Heated argon is pumped by pump 30 through duct 36 and through nozzle 40 to the top of the fuel assembly. Because the nozzle 40 matches closely with the top of the insulated transfer container 16, the heated argon is forced through the fuel assembly's coolant passages and out the bottom to the receiving nozzle 48. The gas is then recirculated back to the pump 30 and heating elements 34 for reheating and recirculation. In this way the fuel assembly is heated from the top down since the hottest gas always passes through the uppermost portions of the fuel assembly first. By providing two or more heating stations 39, two or more fuel assemblies can be heated simultaneously thereby reducing the time required for this preheating step. As a result of this invention, the speed at which new fuel can be loaded into the reactor is not limited by the requirement of preheating the fuel but is limited by other refueling steps. By the time the conveyor removes the fuel assembly from the last heating station 41 the sodium bond has been melted and the fuel assembly temperature has been raised to 375°F. The conveyor moves this heated fuel assembly to a position immediately below the floor valve 44 which leads into the reactor containment building 50. Prior to opening the floor valve 44, a refueling machine 46 is positioned above the valve in a sealing engagement. The floor valve 44 is then opened and the heated fuel assembly 18 is raised into the new fuel transfer machine 46. The floor valve 44 is next closed and the new fuel assembly 18 is conveyed by the new fuel transfer machine 46 to the reactor vessel for loading into the reactor core.

What is claimed is:

1. An improved nuclear reactor fuel handling system of the type having a transporter which conveys a new nuclear fuel assembly with coolant channels longitudinally therethrough through an isolation chamber into the nuclear reactor containment building, wherein the improvement comprises:
   a. a heating station located in said isolation chamber for heating said fuel assembly from one end by passing heated fluid through the length of said fuel assembly; and
   b. a transfer container mounted on said transporter for transporting said fuel assembly through said isolation chamber and into registry with said heating station, said transfer container adapted to carry said fuel assembly on its interior and said transfer container having a bottom plate with at least one perforation for allowing the passage of a fluid therethrough.

2. The improved nuclear reactor fuel handling system as recited in claim 1 wherein said transfer container has a length at least equal to the length of said fuel assembly and wherein said heating station includes:
   a. a pump having a suction side and a pressure side;
   b. a first duct connected to said pressure side of said pump and adapted to terminate in close registry with one end of said transfer container and adapted to have an outlet end which matches the cross sectional shape of said transfer container;
   c. heating elements located within said first duct for preheating the circulated fluid; and
   d. a second duct connected to said suction side of said pump and adapted to originate in close registry with the other end of said transfer container and adapted to have an inlet end which matches the cross sectional shape of said transfer container, whereby heated fluid may be circulated through said fuel assembly from one end to the other thereby assuring that said fuel assembly is heated only from said one end.

3. The improved nuclear reactor fuel handling system as recited in claim 1 wherein said transfer container is an insulated container and wherein said bottom plate of said transfer container is adapted to sealingly engage with one end of said fuel assembly and wherein said at least one perforation in said bottom plate is adapted to axially align with at least one of said coolant channels longitudinally extending through said fuel assembly.

4. The improvement as recited in claim 2 wherein said nuclear fuel is of the type in which the fuel of each fuel element is clad with a cladding and the gap between the fuel and the cladding is filled with a heat transfer material which exhibits a solid form at room temperature and a liquid form at reactor refueling temperatures, each fuel element being provided with an expansion chamber at one end of each element to accommodate thermal expansion of the heat transfer material and of the fuel material.

5. The improvement as recited in claim 2 wherein said isolation chamber contains an inert gas, said gas comprising the fluid which is heated and directed through said fuel assembly.

* * * * *